Sept. 6, 1949.  A. L. LEE  2,481,128
LOADING MACHINE
Filed March 15, 1946
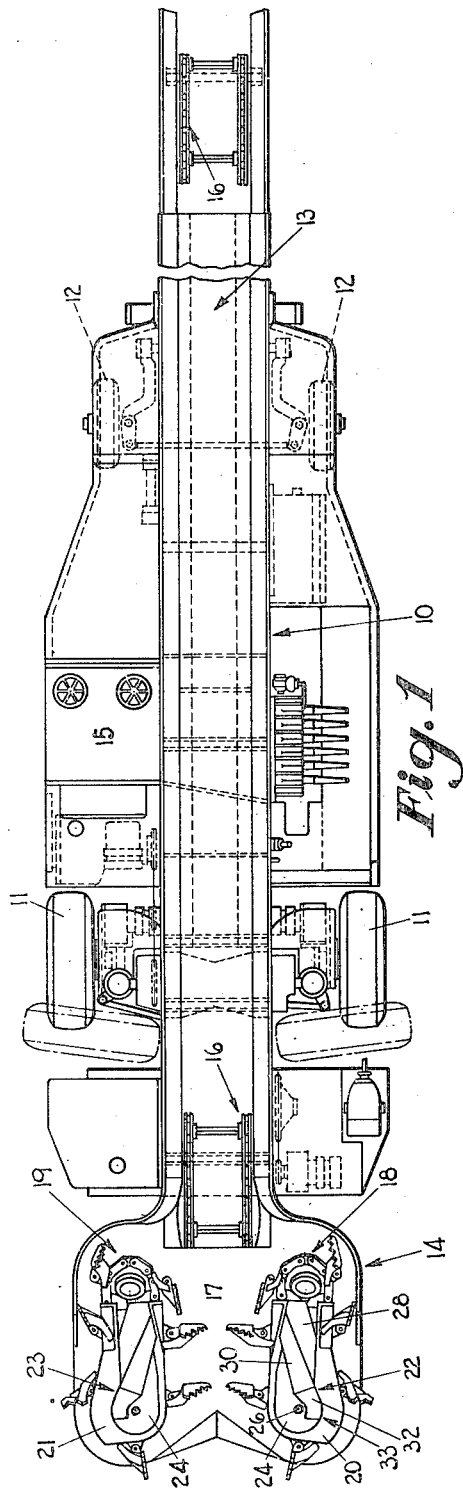
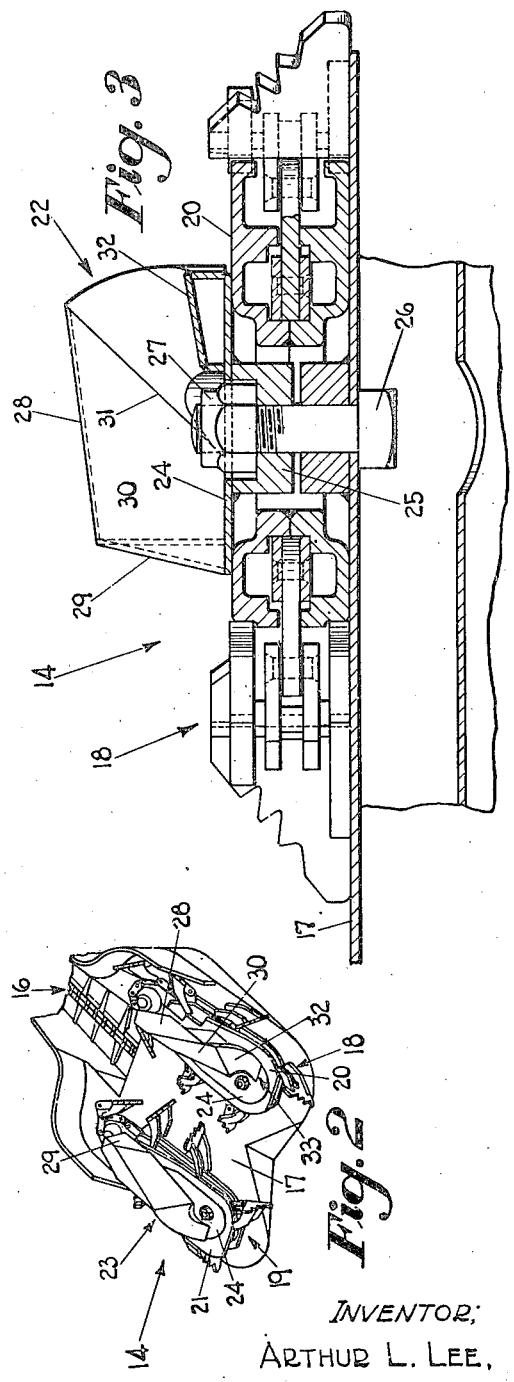
INVENTOR:
ARTHUR L. LEE,
By Hacker H. Stetson,
ATT'Y.

Patented Sept. 6, 1949

2,481,128

UNITED STATES PATENT OFFICE 2,481,128

LOADING MACHINE

Arthur L. Lee, Upper Arlington, Ohio, assignor to The Jeffrey Manufacturing Company, a corporation of Ohio Application March 15, 1946, Serial No. 654,622

1 Claim. (Cl. 198—8)

This invention relates to a loading machine.

An object of the invention is to provide a loading machine with an improved gathering head which will increase the gathering efficiency thereof.

Other objects of the invention will appear hereinafter, the novel features and combination being set forth in the appended claim.

In the accompanying drawings,

Fig. 1 is a plan view of a loading machine incorporating the features of my invention;

Fig. 2 is a perspective view, showing the loading head; and

Fig. 3 is a sectional view through one of the gathering conveyers and a portion of one of the plows or guides.

Much of the structure of the loading machine herein disclosed is the same as that disclosed in my application for a Loading machine, Serial No. 530,361, filed April 10, 1944 and, except for such differences as are herein pointed out, it is to be understood that the machine follows the disclosure of said application.

Referring particularly to Fig. 1 of the drawings, the loading machine illustrated includes a main frame 10 which is mounted upon a pair of swingable front traction wheels 11 and a pair of rear steering wheels 12. Extending longitudinally along the main frame 10 is a telescoping conveyer trough 13, one portion of which is provided with a gathering head 14, which gathering head together with one portion of the telescoping through 13 may be reciprocated or fed rectilinearly forwardly and rearwardly with respect to the main frame 10.

A driving motor 15 is provided to drive an endless chain and flight conveyer 16 which extends through the telescoping through 13 and conveys any material delivered to it from the front end to the rear end at which the material is discharged into an appropriate receptacle. The motor 15 also provides the primary source of power for driving the traction wheels 11 as well as for reciprocating the gathering head 14 and driving the gathering conveyers thereon, all as described in complete detail in my above-mentioned application Serial No. 530,361.

The gathering head 14 includes an upwardly sloping flat plate 17 over which the coal or like material, which is being gathered, is scraped or conveyed by a pair of laterally spaced orbitally traveling longitudinally extending endless chain and flight gathering conveyers or devices 18 and 19.

As clearly illustrated in Figs. 1 and 2 of the drawings, the gathering conveyers 18 and 19 are symmetrically spaced about a longitudinal axis running through the center of the gathering head 14 and through the center of the conveyer trough 13. During operation of the device the gathering head 14 is fed rectilinearly forward into a pile of shot or semi-compact coal and the gathering conveyers 18 and 19 gather the coal and convey it rearwardly over the center portion of the plate 17, delivering it to the rear end of the trough 13, along which trough it is conveyed by the endless conveyer mechanism 16.

It has been found in practice that an appreciable amount of coal tends to build up on top of guide bars 20 and 21 of the gathering devices 18 and 19 and some of it tends to spill over onto the outer edge thereof, thus being lost or conveyed back toward the coal which is being gathered.

It has been found that the efficiency of the gathering head 14 can be appreciably increased by employing a pair of plows or guides 22 and 23 in association with the gathering devices 18 and 19. Except for the fact that they are reversely constructed the guide devices or plows 22 and 23 are of similar construction and thus a description of one will suffice for both.

Plow or guide 22 comprises an irregular box-shaped structure including a bottom plate 24 having a pair of cups adjacent opposite ends, one of which is seen at 25. Each of the two cups of plate 24, of which cup 25 is one, receives a bolt, one of which is seen at 26, which extends through the plate 17, and a reinforcing lug is provided with a nut 27, thus rigidly attaching the plow or guide 22 to the upper surface of the guide bar 20 of the gathering conveyer 18.

Guide or plow 22 includes a rear generally horizontal, but slightly inwardly sloping, top plate 28 and near its rear or discharge end is provided with a generally upright, though slightly upwardly and outwardly sloping, rear plate portion 29. Extending forwardly from the plate 29 and attached at its top to the top plate 28 and at its bottom to the bottom plate 24 is an upwardly and outwardly sloping plate 30.

As is clearly illustrated in Figs. 2 and 3 of the drawings, plate 30 has a greater slope at its foremost or outer edge, which is indicated at 31, than adjacent its rearmost edge where it attaches to plate 29. Furthermore, in addition to this progressive increase in slope of plate 30 from its rear end to its front end, said plate also diverges outwardly from the rear end to the front end. Stated another way, the plate 30 converges from its front edge 31 towards its rear edge which adjoins plate 29 and co-operates with said plate 29 to form one side wall of a converging trough which is effected by the two plows 22 and 23, the trough being completed by the frame members of the gathering mechanisms 18 and 19 and by the longitudinal center portion of the plate 17.

In other words, this converging upward wall of the trough thus formed by the structure just described co-operates to converge the coal or like material as it is conveyed upwardly and rearwardly along the axial center of plate 17 and is ultimately discharged into the receiving end of the trough 13 and conveyed rearwardly by conveyer 16. Thus the plows 22 and 23 prevent any appreciable spilling of coal or like material, once it is received between the two gathering conveyers 18 and 19.

Adjacent its forward end the plow 22 is provided with a nose which is formed by a plate 32 having curved side edges and which at its rear end joins at 31 with the front end of sloping plate 30 and which at its foremost end terminates in a horizontal edge in contact with the bottom plate 24. The nose 33 thus formed extends around the nut 27 and acts somewhat as a scoop to guide the material which may fall on the guide bar 20 into the trough provided by the gathering head 14, as above described. It is, of course, obvious that all of the structure described in detail for the plow 22 has a counterpart in the plow 23.

During the operation of the unit, as the loose or semi-compact coal is gathered in by the flights of the gathering conveyers 18 and 19 and scraped across the longitudinal center of the plate 17, the plows 22 and 23 will co-operate to form a converging trough, looking from the front to the rear or in the direction of travel of the material. These plows will substantially prevent material falling off the head 14 and will confine it to the center portion thereof where it will be conveyed rearwardly by the gathering conveyers 18 and 19 under most all conditions of operation. As a consequence, the efficiency of the gathering head has been materially increased and it has been found in practice that the capacity of a loader has been largely limited by the capacity of the gathering head.

The improved gathering head construction is illustrated in connection with a particular type of loader and I have found it to be particularly efficient in connection with this loader in which the head is positively fed into the coal. It is to be understood, however, that in certain broader aspects of the invention it is not to be limited to this type of loader, but may be employed with other types of loaders and with loaders conceivably having slightly different gathering devices than the endless chain and flight gathering conveyers illustrated.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

A gathering head for a loading machine including a conveyer, a plate adjacent one end of said conveyer over which material being gathered is scraped onto said conveyer, a pair of orbitally traveling longitudinally extending endless chain and flight gathering conveyers including guide bars carried above said plate spaced symmetrically about a horizontal axis running through said conveyer, the endless chain and flight gathering conveyers co-operating with said plate to form a trough through which said endless chain and flight conveyers scrape material being gathered onto said conveyer, a pair of similar reversely constructed material guiding plows carried above said endless chain and flight conveyers for directing material being gathered into said trough, each of said plows including a flat bottom plate adapted to be mounted rigidly upon the top of one of said endless chain and flight conveyer guide bars, and continuous wall means the front edge of which lies substantially horizontal and adjacent said bottom plate and the rearward portion of which converges rearwardly from said front edge to form an inwardly sloping wall whereby said plows co-operate to form a rearwardly converging trough for directing loose material above said endless chain and flight guide bars into said trough as the gathering head enters loose material being gathered.

ARTHUR L. LEE.

REFERENCES CITED

The following references are of record in the file of this patent:

UNITED STATES PATENTS

| Number | Name | Date |
| --- | --- | --- |
| 1,448,756 | MacEachen | Mar. 20, 1923 |
| 2,113,733 | Kraft | Apr. 12, 1938 |